United States Patent [19]
Makita

[11] Patent Number: 5,119,275
[45] Date of Patent: Jun. 2, 1992

[54] AIMABLE HEADLAMP HAVING A DISCHARGE LAMP BULB AND A LIGHTING CIRCUIT POSITIONED IN PROXIMITY THEREOF

[75] Inventor: Hiroyuki Makita, Shimizu, Japan

[73] Assignee: Koito Manufacturing Co., Ltd., Shizuoka, Japan

[21] Appl. No.: 685,769

[22] Filed: Apr. 16, 1991

[30] Foreign Application Priority Data

May 18, 1990 [JP] Japan .................. 2-128338

[51] Int. Cl.$^5$ .............................. B60Q 1/06
[52] U.S. Cl. ........................ 362/61; 362/66
[58] Field of Search ............... 362/61, 66, 83

[56] References Cited
U.S. PATENT DOCUMENTS

4,760,501 7/1988 de Vrijer .
4,823,049 4/1989 Sanders et al. .

Primary Examiner—Carroll B. Dority
Attorney, Agent, or Firm—Sughrue, Mion, Zinn, Macpeak & Seas

[57] ABSTRACT

An aimable vehicular headlamp system has a discharge lamp assembly to be mounted to a vehicle body via aiming screws. The discharge lamp assembly comprises a discharge lamp bulb, and a bulb carrier subassembly directly coupled, both mechanically and electrically, to the lamp bulb. Also included is a lighting circuit assembly comprising a ballast section for providing a high alternating voltage, and an igniter section electrically connected between the ballast section and the bulb carrier subassembly of the discharge lamp assembly for causing the lamp bulb to glow by an electric discharge. At least the igniter section of the lighting circuit is mounted to the discharge lamp assembly, typically on the back of a reflector included in the discharge lamp assembly, for joint movement therewith relative to the vehicle body during the aiming adjustment of the discharge lamp assembly. Consequently, the lighting circuit assembly can be electrically connected to the discharge lamp assembly without use of any such elongate cables or cords as have been conventionally employed to this end.

8 Claims, 9 Drawing Sheets

AIMABLE HEADLAMP HAVING A DISCHARGE LAMP BULB AND A LIGHTING CIRCUIT POSITIONED IN PROXIMITY THEREOF

BACKGROUND OF THE INVENTION

This invention relates generally to vehicle headlamps and particularly to those employing discharge lamp bulbs as light sources. More particularly, the invention deals with a vehicle headlamp system having provisions for aiming the headlamp assembly both horizontally and vertically and retaining the same in the proper position. Still more particularly, the invention pertains to such an aimable vehicle headlamp system featuring improved electrical connection between the discharge lamp assembly and an electric lighting circuit assembly.

Discharge lamps, notably including metal halide lamps, are finding ever increasing acceptance as light sources of vehicular headlamps. There has, however, been a problem left unsolved in use of discharge lamps for vehicular headlamp applications. The discharge lamp units of a headlamp system need electric lighting circuits including a voltage booster for providing a high voltage required for each discharge lamp bulb to glow by an electric discharge between the pair of electrodes opposed to each other within the bulb. The lighting circuits themselves are powered by the battery that is customarily mounted on the motor vehicle.

Conventionally, the lighting circuits have been positioned considerable distances away from the aimable discharge lamp assemblies. Elongate cables or cords have been used for electrically connecting the lighting circuits to the lamp assemblies. The present applicant objects to the use of such elongate cables that conduct currents at high voltages. One reason for this objection is the possibility of current leakage from the cables. Another reason is that the elongate cables are very easy to produce electric noise. Such sources of noise production should be eliminated, or at least reduced to an absolute minimum, as today's vehicles, passenger cars in particular, are furnished with an increasing number of electric or electronic appliances.

For all these reasons there have been strong demands from the automobile industry for the advent of headlamp systems that employ discharge lamps with no, or minimum lengths of, high voltage supply cables.

SUMMARY OF THE INVENTION

The present invention aims at the drastic curtailment, or even total elimination where desired, of cables or cords heretofore used for electrically connecting an aimable discharge lamp assembly and a lighting circuit assembly in a vehicle headlamp system of the type defined.

Briefly, the invention may be summarized as an aimable headlamp system to be mounted to a vehicle body. The headlamp system broadly comprises a discharge lamp assembly and a lighting circuit assembly. The discharge lamp assembly resolves itself into a discharge lamp bulb subassembly including a discharge lamp bulb, and a bulb carrier subassembly directly coupled, both mechanically and electrically, to the discharge lamp bulb subassembly. The complete discharge lamp assembly is to be movably mounted to the vehicle body via aiming means which typically include aiming screws. The lighting circuit assembly, on the other hand, comprises an electric lighting circuit and a housing therefor. The lighting circuit comprises a ballast section for providing an alternating voltage, and an igniter section connected between the ballast section and the bulb carrier subassembly of the discharge lamp assembly for causing the discharge lamp bulb to glow by an electric discharge. Enclosing at least the igniter section of the electric lighting circuit, the circuit housing is mounted to the discharge lamp assembly for joint movement therewith relative to the vehicle body.

In one embodiment of the invention to be disclosed herein, the circuit housing encloses the complete lighting circuit. Since the circuit housing is mounted to the discharge lamp assembly for joint aiming movement therewith relative to the vehicle body, the lighting circuit can be electrically connected to the bulb carrier subassembly, and hence to the discharge lamp bulb, without use of any cables or with use of minimum lengths of cables.

In another embodiment the circuit housing encloses only the igniter section of the lighting circuit. The ballast section of the lighting circuit is enclosed in a second circuit housing which is immovably mounted to the vehicle body in the vicinity of the first recited circuit housing. The igniter section and the ballast section are electrically interconnected via very short cables or like flexible conductor means.

Either way, there will be no high voltage cables or other conductors left exposed, or placed within easy reach of the operator, when the front hood of the vehicle is opened. As an additional advantage, the discharge lamp assembly and the lighting circuit assembly can be electrically directly coupled to each other, or with minimum lengths of cables where required. Noise production from such high voltage conductors of reduced lengths is neglibibly small compared with that according to the prior art.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

General

Figure 1:
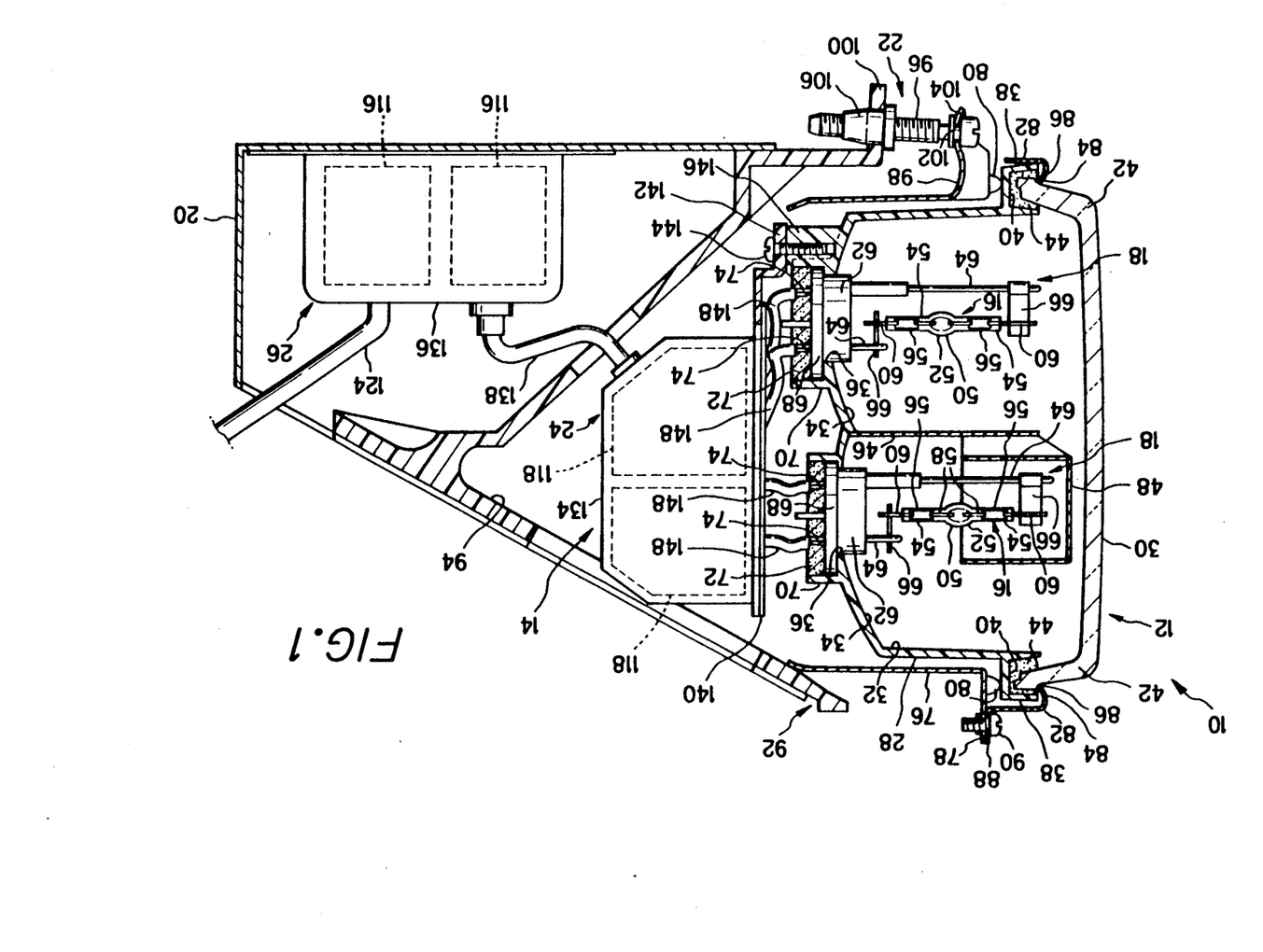
FIG. 1 is a vertical section through an aimable, dual beam vehicle headlamp constructed in accordance with the novel concepts of this invention.
Figure 2:
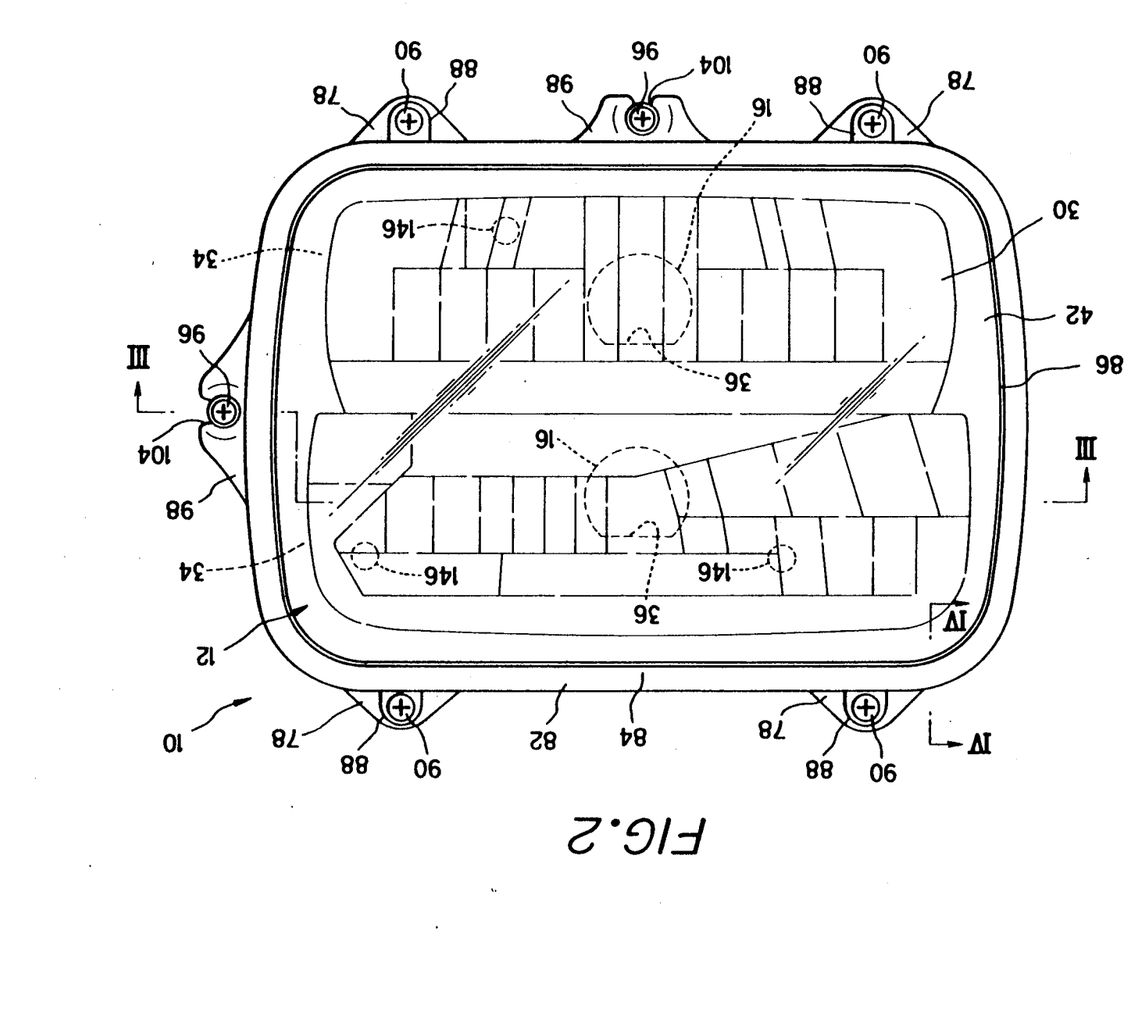
FIG. 2 is a front elevation of the headlamp of FIG. 1.
Figure 3:
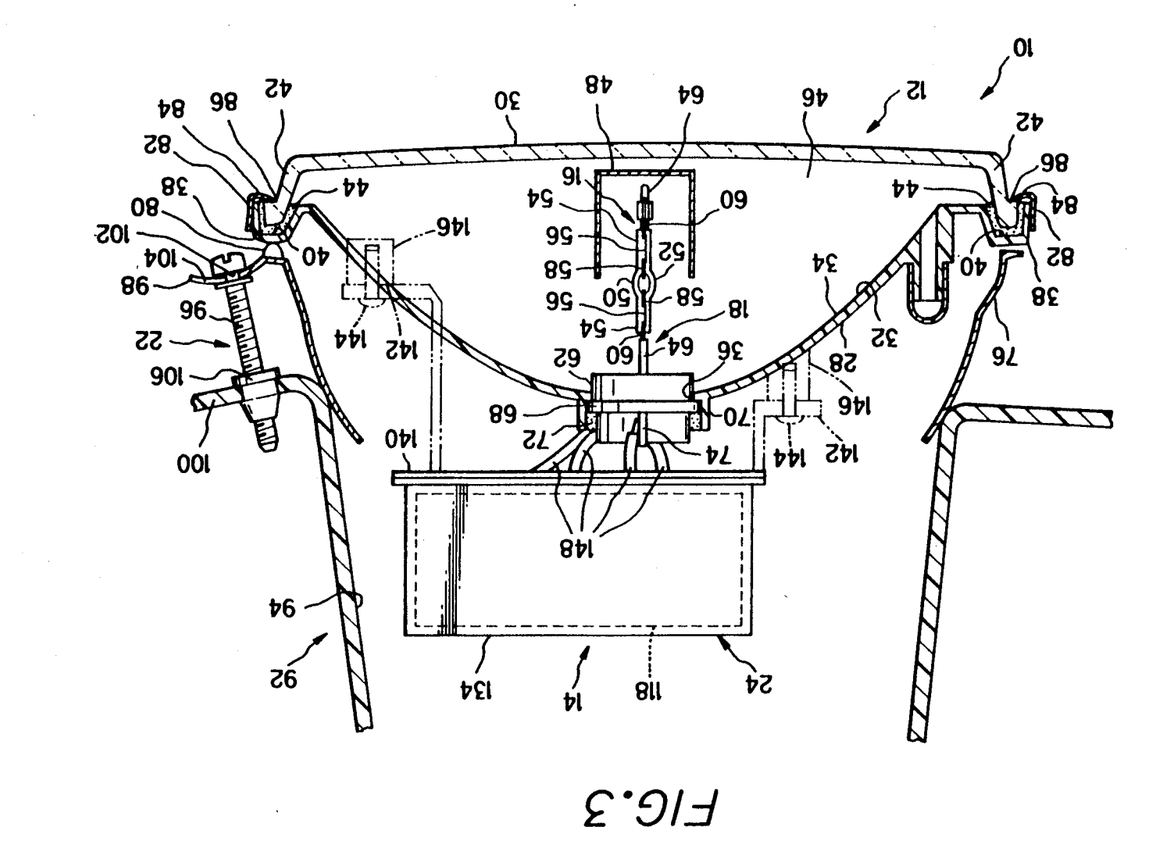
FIG. 3 is a horizontal section through the headlamp, taken along the line III—III in FIG. 2.

Reference is first directed to FIGS. 1-3 for a consideration of the general organization of the aimable discharge lamp system illustrated therein by way of a first preferred embodiment of this invention. Generally designated 10, the discharge lamp system broadly comprises a discharge lamp assembly 12 and a lighting circuit assembly 14. The discharge lamp assembly 12 comprises two discharge lamp bulb subassemblies 16 and two bulb carrier subassemblies 18 in this particular embodiment. The bulb carrier subassemblies 18 function to mechanically support the respective discharge lamp bulb subassemblies 16 and also to electrically connect the same to the lighting circuit assembly 14. The complete discharge lamp assembly 12 is mounted to a vehicle body 20, FIG. 1, via aiming means 22, FIGS. 1 and 3, thereby to be tilted both horizontally and vertically with respect to the vehicle body.

The lighting circuit assembly 14 is herein shown divided into an igniter circuit subassembly 24 and a ballast circuit subassembly 26. The igniter circuit subassembly 24 includes the igniter sections of two lighting circuits for the two discharge lamp bulb subassemblies 16. Each lighting circuit is configured as shown block diagrammatically in FIG. 5. The ballast circuit subassembly 26 includes the ballast sections of the lighting circuits. The igniter circuit subassembly 24 is mounted to the discharge lamp assembly 12 for joint tilting movement therewith relative to the vehicle body 20.

The following is a more detailed discussion of the above listed discharge lamp assembly 12, discharge lamp bulb subassemblies 16, bulb carrier subassemblies 18, aiming means 22, and lighting circuit assembly 14, in that order. Such discussion will be divided under separate headings for the clarity of disclosure.

Discharge Lamp Assembly

With reference to FIGS. 1-3 the discharge lamp assembly 12 comprises a lamp body 28 and a lens 30. Molded from a plastic, the lamp body 28 is generally tubular in shape, open at one end and closed at the other. The lens 30 is attached to the open end of the lamp body 28 and defines a lamp chamber 32 in combination therewith. The noted discharge lamp bulb subassemblies 16 and bulb carrier subassemblies 18 are mounted in this lamp chamber 32.

Hereinafter in this specification, the directional terms such as "front" and "rear", "forward" and "rearward", and derivatives thereof will be used to refer to the right and to the left, respectively, of the headlamp as viewed in FIG. 1. Thus, for example, the lens 30 is attached to the open front end of the lamp body 28, and the igniter circuit subassembly 24 is mounted on the rear of the lamp body. Also, the directional terms such as "upper" and "lower", "top" and "bottom", "upward" and "downward", and derivatives thereof will be used in reference to the upward and downward direction, respectively, of the headlamp as viewed in FIG. 1.

The lamp body 28 is formed to provide two paraboloidal reflectors 34 disposed one on top of the other. Holes 36 are cut centrally in the reflectors 34 for mounting the bulb carrier subassemblies 18 to the lamp body 28 in a manner yet to be described.

FIGS. 1 and 3 indicate that the lamp body 28 has an L shaped flange 38 extending all along its front edge to define a forwardly open groove 40 of annular shape. The lens 30 has an annular rim 42 turned rearwardly from its periphery. The lens rim 42 is loosely received in the lamp body groove 40 and firmly retained therein by an adhesive 44.

FIG. 1 also shows a partition 46 attached to the lamp body 28 so as to divide the lamp chamber 32 into an upper and a lower compartment. Attached to the partition 46, a shield cap 48 is disposed in the upper compartment so as to partly envelope the upper lamp bulb subassembly 16.

Discharge Lamp Bulb Subassemblies

The discharge lamp bulb subassemblies 16 for use in this headlamp system 10 can be of any known or suitable design. Also, the two bulb assemblies 16 employed in this embodiment are identical in construction, so that the description one applies to the other.

As will be best understood from FIG. 1, each discharge lamp bulb subassembly 16 included in the discharge lamp assembly 12 has a bulb or envelope 50 of vitreous material comprising a hollow body 52 in the shape of a prolate sphere with a pair of pinch seals 54 extending in opposite directions therefrom. The pinch seals 54 have a pair of metal foils 56 separately embedded therein. These metal foils are electrically connected one to each of a pair of rod shaped electrodes 58 which partly extend into the hollow body 52 of the envelope 50. The discharge lamp bulb is to glow by an electric discharge between the opposed ends of the electrodes 58. The metal foils 56 are also connected to a pair of bulb leads 60 partly buried one in each pinch seal 54 and extending in opposite directions therefrom.

Bulb Carrier Subassemblies

The two bulb carrier subassemblies 18, forming parts of the discharge lamp assembly 12, can also be conventional and identical in construction. Therefore, the following description of one bulb carrier subassembly applies to the other.

As best revealed by FIG. 1, each bulb carrier subassembly 18 has a carrier base 62 of cylindrical shape and electrically insulating material. Extending through the carrier base 62 in parallel spaced relation to each other are a pair of bulb support wires 64 which have portions of different lengths projecting forwardly from the carrier base. The distal ends of the bulb support wires 64 are coupled to the pair of lamp leads 60 of one associated discharge lamp bulb subassembly 16 via metal made bridges 66.

A consideration of both FIGS. 1 and 3 will make clear how each bulb carrier subassembly 18, carrying one discharge lamp bulb subassembly 16 as above, is mounted to the lamp body 28. Each bulb carrier subassembly 16 is inserted forwardly into and through one of the mounting holes 36 in the lamp body 28 until a flange 68 on the carrier base 62 becomes snugly received in a sleeve 70 which is formed on the back of the lamp body 28 in one piece therewith. An adhesive 72 is filled in the space left by the carrier base flange 68 within the sleeve 70 against the possibility of accidental detachment of the bulb carrier subassembly 18 from the lamp body 28. The noted pair of bulb support wires 64 have portions 74 projecting rearwardly from the carrier base 62 and extending through the adhesive 72 for electrical connection to the lighting circuit assembly 14.

Thus the two bulb carrier subassemblies 18 serve to mechanically support the respective discharge lamp bulb subassemblies 16 in position with respect to the lamp body 28. Additionally, the bulb carrier subassemblies 18 function to electrically connect the discharge lamp bulb assemblies 16 to the lighting circuit assembly 14 in a manner to be detailed subsequently.

It is believed to be clear from the foregoing how the discharge lamp bulb subassemblies 16, bulb carrier subassemblies 18, lamp body 28 and lens 30 are combined to make up the discharge lamp assembly 12. The discharge lamp assembly of this construction is mounted to the vehicle body 20 by means including the aiming means 22, as set forth in detail in the following.

Aiming Means

At 76 in FIGS. 1 and 3 is seen a mounting ring of generally tubular shape surrounding the discharge lamp assembly 12. The mounting ring 76 has a plurality (four in this embodiment, as shown in FIG. 2) of lugs 78 formed on its front end. Each lug 78 has a boss 80 held against the back of the flange 38 on the lamp body 28.

Disposed forwardly of the mounting ring 76 is a retaining ring 82 for holding the discharge lamp assembly 12 against the mounting ring. The retaining ring 82 has an annular rim 84 turned inwardly from its front end into positive engagement with a flange 86 on the rim 42 of the lens 30. Also, the retaining ring 82 has a plurality of, four in this embodiment, lugs 88 bent outwardly from its rear end. Held against the lugs 78 on the mounting ring 76, the retaining ring lugs 88 are screwed at 90 to the mounting ring lugs. Thus the complete discharge lamp assembly 12 is firmly carried by the retaining ring 82 and thence by the mounting ring 76.

The reference numeral 92 in FIGS. 1 and 3 denotes a headlamp housing mounted fast to the vehicle body 20. The headlamp housing 92 defines a forwardly open space 94 for accommodating the discharge lamp assembly 12 as well as the igniter circuit subassembly 24 of the lighting circuit assembly 14. The mounting ring 76 has its outer surface slidably held against the headlamp housing 92. The discharge assembly 12 with the mounting ring 76 and retaining ring 82 is aimably mounted to the headlamp housing 92 via the aiming means 22, as will be detailed hereafter.

The primary components of the aiming means 22 are a plurality of, two in this embodiment, aiming screws 96, FIGS. 1-3, fastening the mounting ring 76 to the headlamp housing 92. More specifically, each aiming screw 96 joins a lug 98 on the mounting ring 76 to a lug 100 on the headlamp housing 92. The head of each aiming screw 96 has an annular groove 102 in order to be rotatably received in a recess 104 in one of the mounting ring lugs 98. The aiming screws 96 are operatively engaged in nuts 106 which are immovably supported by the headlamp housing lugs 100.

Figure 4:
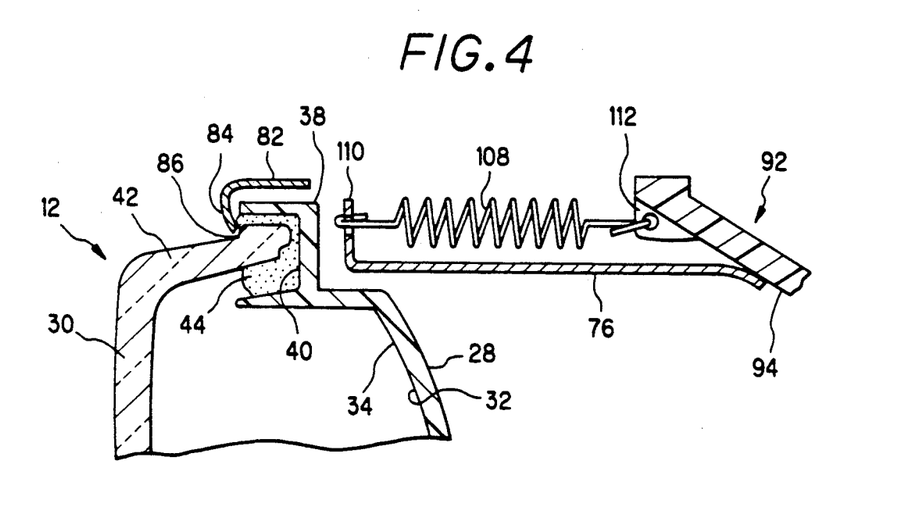
FIG. 4 is an enlarged, fragmentary vertical section through the headlamp, taken along the line IV—IV in FIG. 2 and showing in particular how the headlamp is sprung to the vehicle body for aiming purposes.

Besides being coupled to the headlamp housing 92 via the two aiming screws 96, the mounting ring 76 is urged against the headlamp housing by a helical compression spring seen at 108 in FIG. 4. This figure is a section taken along the line IV—IV in FIG. 2, from which will become apparent the position of the compression spring 108 with respect to the two aiming screws 96. The compression spring 180 has its opposite extremities hooked to a spring retainer 110 on the mounting ring 76 and to another spring retainer 112 on the headlamp housing 92.

Thus, for aiming the discharge lamp assembly 12, the two aiming screws 96 may be turned in either a tightening or a loosening direction. The discharge lamp assembly 12, as well as the mounting ring 76 and retaining ring 82, will then tilt, both vertically and horizontally, with respect to the vehicle body 20.

Lighting Circuit Assembly

The two discharge lamp bulb subassemblies 16 employed in this headlamp system 10 require two lighting circuits. Partly for this reason the lighting circuit assembly 14 is divided as aforesaid into an igniter circuit subassembly 24 and a ballast circuit subassembly 26 in this particular embodiment. The construction of the lighting circuit assembly 14 will be best understood by first considering the electrical configuration of the lighting circuit for each discharge lamp bulb subassembly 16.

Figure 5:
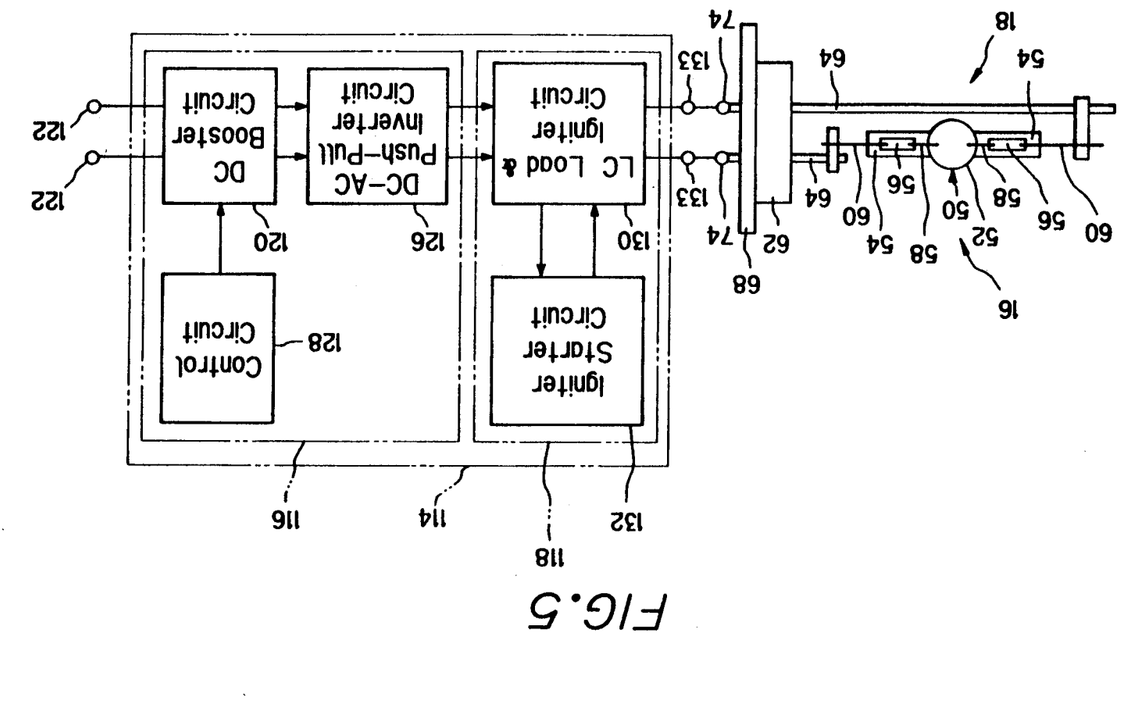
FIG. 5 is a block diagram of the lighting circuit for each discharge bulb used in the headlamp, the lighting circuit being shown together with a schematic representation of one of the discharge lamp bulbs and other means closely associated therewith.

With reference directed therefore to FIG. 5 each lighting circuit 114 may be broadly envisaged as a combination of a ballast 116 and an igniter 118. The ballast 116 includes a d.c. booster circuit 120 having a pair of inputs 122. As will be understood by referring back to FIG. 1, these inputs 122 of the d.c. booster circuit 120 are to be connected via a cable 124 to a battery, not shown, that is customarily mounted on the motor vehicle.

Also included in the ballast 116 are a d.c.-a.c. push-pull inverter circuit 126 and a control circuit 128. Connected to the output of the d.c. booster circuit 120, the inverter circuit 126 functions to translate the direct output voltage of the booster circuit into a sinusoidal voltage. The control circuit 128 is intended to control the output voltage of the booster circuit 120 as required by such parameters as the extinction time of the associated discharge lamp bulb subassembly 16.

The igniter 118 comprises an LC load and igniter circuit 130 and an igniter starter circuit 132. The LC load and igniter circuit 130 has its input connected to the d.c.-a.c. push-pull inverter circuit 126. The igniter starter circuit 132 comprises means, not shown, for supplying a starting current to the igniter circuit 130 and for detecting the lamp current. The pair of output terminals 133 of the LC load and igniter circuit 126 are connected to the end portions 74 of the pair of bulb support wires 64 of one of the two bulb carrier subassemblies 18 of the discharge lamp assembly 12.

Referring once again to FIG. 1, it will be seen that the igniter circuit subassembly 24 of the lighting circuit assembly 14 has a circuit housing 134 enclosing the igniters 118 of the lighting circuits 114 for both discharge lamp bulb subassemblies 16. The igniter circuit housing 134 is disposed within the headlamp housing 92.

The ballast circuit subassembly 26 has another circuit housing 136 enclosing the ballasts 116 of the lighting circuits 114 for both discharge lamp bulb subassemblies 16. The ballast circuit housing 136 is mounted fast on the vehicle body 20, in a position just behind the headlamp housing 92. A flexible cable 138 extends between igniter circuit subassembly 24 and ballast circuit subassembly 26 for electrically interconnecting the circuit means within the housings 134 and 136. Although the lighting circuit assembly 14 is divided into the igniter circuit subassembly 24 and the ballast circuit subassembly 26 in this particular embodiment, the flexible cable 138 can be very short because of the close proximity of the two circuit subassemblies.

An inspection of FIGS. 1 and 3 will show how the igniter circuit subassembly 24 of the lighting circuit assembly 14 is mounted to the lamp body 28 in accordance with a feature of this invention. Unlike the fixed ballast circuit subassembly 26, the igniter circuit subassembly 24 is to tilt with the discharge lamp assembly 12 relative to the vehicle body 20 as the discharge lamp assembly is aimed by the aiming screws 96.

The igniter circuit subassembly 24 is attached to a mounting plate 140 disposed behind the lamp body 28. The mounting plate 140 has a plurality of, three in this embodiment, mounting lugs 142 extending forwardly therefrom. These mounting lugs are screwed at 144 to bosses 146 formed on the back of the lamp body 28. The output terminals 133, FIG. 5, of the lighting circuit igniter sections 118 for the two discharge lamp bulb subassemblies 16 are separately connected to the end portions 74 of the bulb support wires 64 via cables 148 of minimum lengths.

The vehicle headlamp system 10 of the foregoing construction according to the invention is conventional in operation. The present invention, as embodied in the headlamp system 10, features the fact that the igniter circuit subassembly 24 is mounted directly to the aimable discharge lamp assembly 12 and electrically connected thereto via the cables 148 of minimum lengths. This novel configuration thoroughly defeats the inconveniences of high voltage current leakage and electrical noise production from elongate cables that have been conventionally employed in aimable headlamp systems of this type.

ALTERNATE EMBODIMENT

General

FIGS. 6-9 illustrate an alternate aimable headlamp system 10a according to this invention. This alternate headlamp system has a lamp body 200 to be fixedly mounted to a vehicle body such as that shown at 20 in FIG. 1. Within the lamp body 200 there is mounted a discharge lamp assembly 202 comprising a reflector 204, a single discharge lamp bulb subassembly 16a, and a bulb carrier subassembly 18a. The discharge lamp subassembly 16a is mounted to the reflector 204 via the bulb carrier subassembly 18a.

The discharge lamp bulb subassembly 16a and bulb carrier subassembly 18a of the alternate headlamp system 10a are shown to be of essentially the same construction as their counterparts 16 and 18 in the FIGS. 1-5 headlamp system 10. The various constituent parts of the discharge lamp bulb subassembly 16a and bulb carrier subassembly 18a are therefore designated in FIGS. 6 and 8 by the same reference numerals as used to denote their corresponding parts in FIGS. 1 and 3. No repeated description of these subassemblies 16a and 18a is considered necessary.

Figure 8:
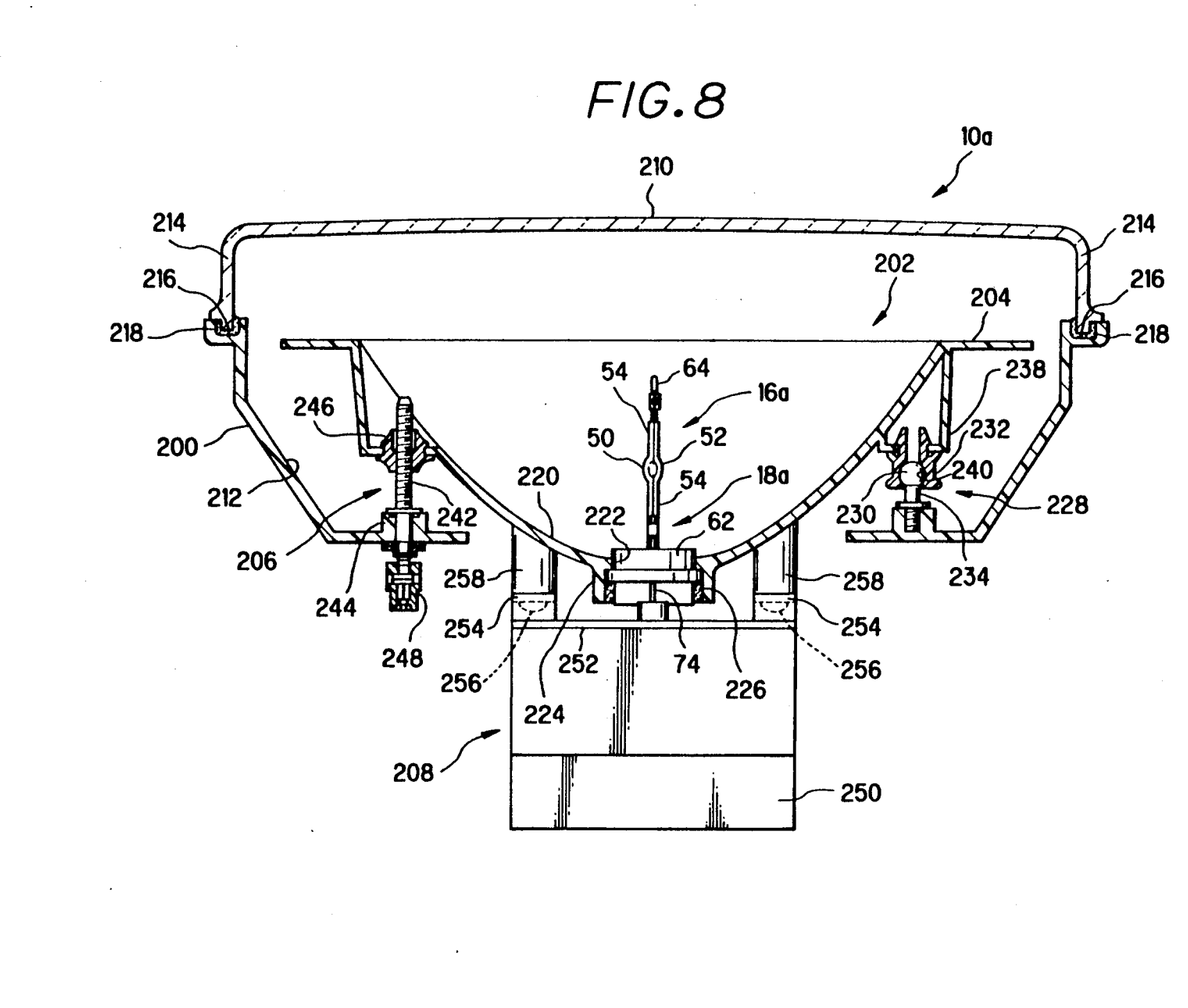
FIG. 8 is a horizontal section through the headlamp, taken along the line VIII—VIII in FIG. 7.
Figure 9:
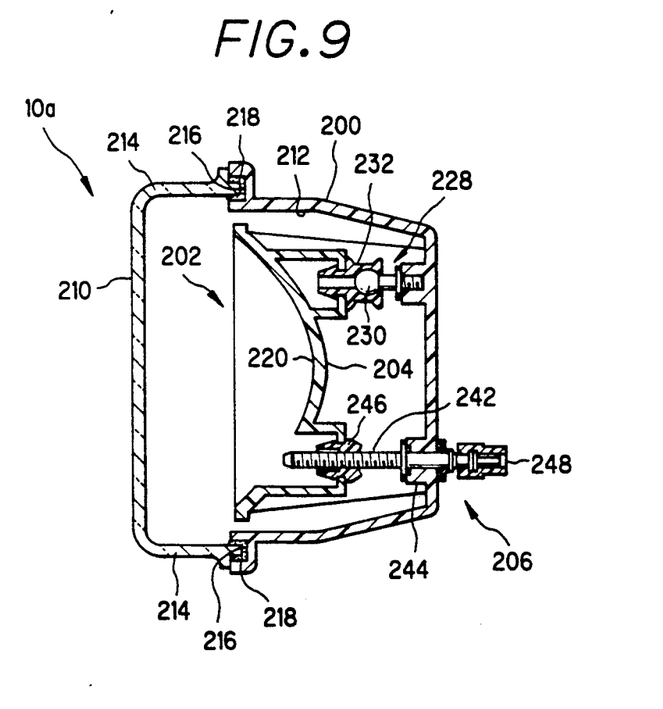
FIG. 9 is a vertical section through the headlamp, taken along the line IX—IX in FIG. 7.

The complete discharge lamp assembly 202 is mounted to the lamp body 200 via aiming means seen at 206 in FIGS. 8 and 9. Thus the discharge lamp assembly 202 is to be tilted both horizontally and vertically with respect to the lamp body 200.

Figure 6:
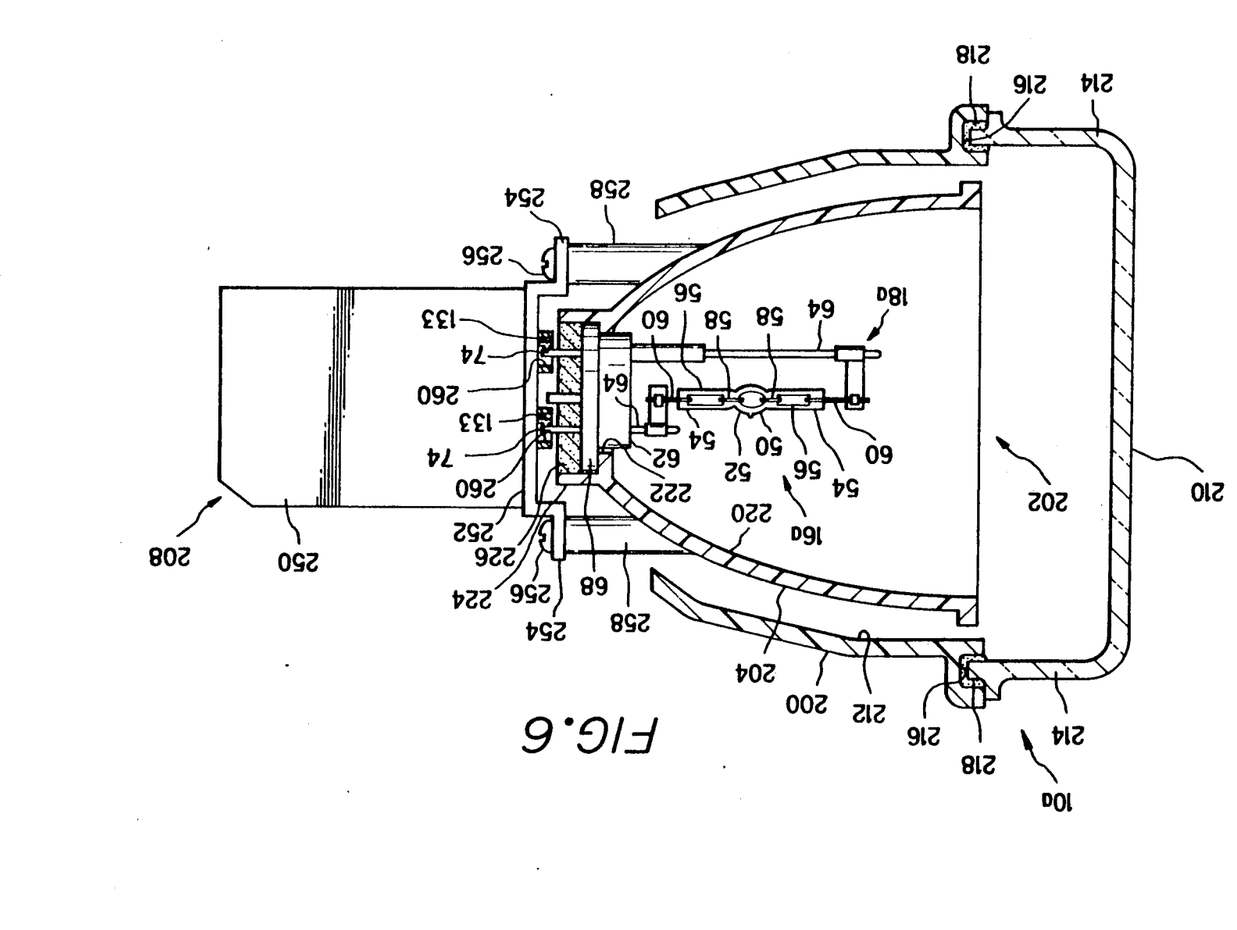
FIG. 6 is a vertical section through an aimable, single beam vehicle headlamp representing another preferred embodiment of the invention.

The alernate headlamp system 10a further includes a lighting circuit assembly 208, FIGS. 6 and 8 for the discharge lamp bulb subassembly 16a. The lighting circuit assembly 208 is mounted to the reflector 204 of the discharge lamp assembly 202 for joint tilting movement with the discharge lamp assembly 208 relative to the lamp body 200. Electrically, the lighting circuit assembly 208 is of the same configuration as that shown at 114 in FIG. 5 but differs from the lighting circuit assembly 14 of the preceding embodiment in that the complete lighting circuit 114 is enclosed in a single housing.

Given hereafter is a more detailed discussion of the above listed lamp body 200, discharge lamp assembly 202 including the reflector 204, aiming means 206, and lighting circuit assembly 208, in that order and under separate headings.

Lamp Body

Figure 7:
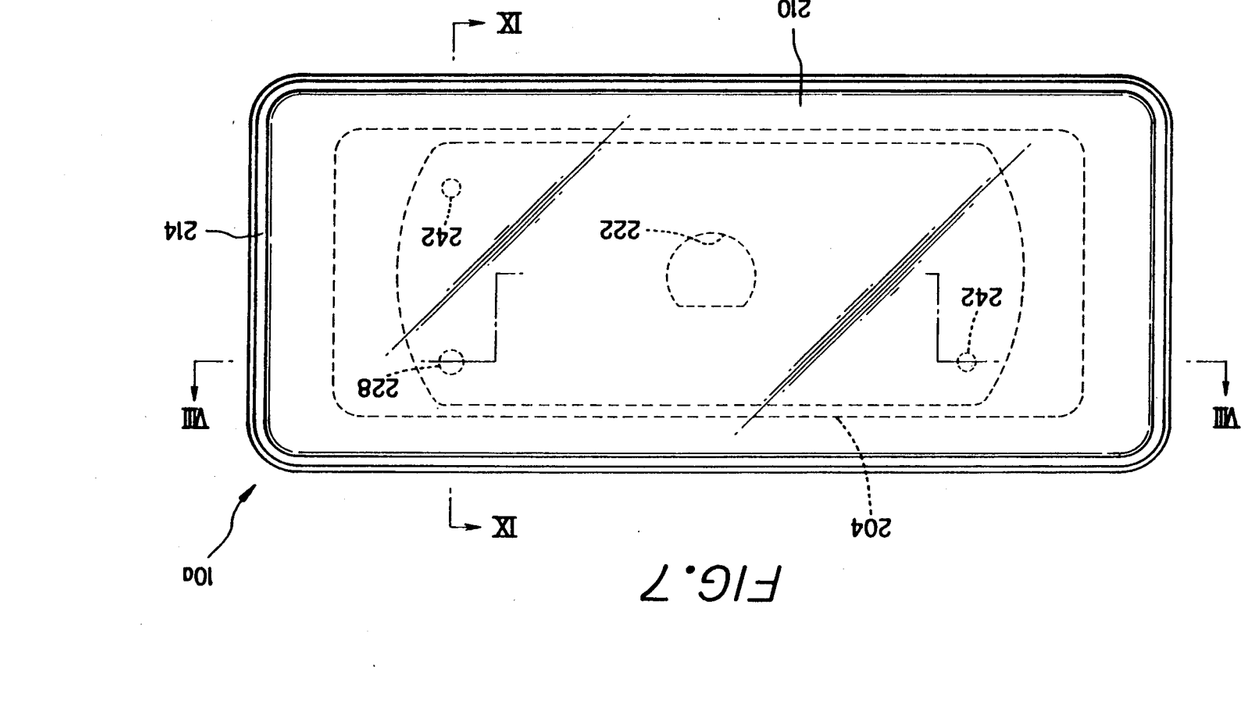
FIG. 7 is a front elevation of the headlamp of FIG. 6.

The lamp body 200 has an open front end of rectangular shape as seen in a front view as in FIG. 7. A lens 210 closes the front end of the lamp body 200 to define a lamp chamber 212 for aimably accommodating the discharge lamp assembly 202. The lens 210 is formed to include an annular rim 214 turned rearwardly from its periphery. The lens rim 214 is engaged in an annular mounting groove 216 formed in the front end of the lens body 200. An adhesive 218 is filled in the spaces left by the lens rim 214 in the mounting groove 216, retaining the lens 210 on the lamp body 200 against the possibility of detachment.

Discharge Lamp Assembly

The discharge lamp assembly 202 comprises as aforesaid the reflector 204, the discharge lamp bulb subassembly 16a and the bulb carrier subassembly 18a, all disposed in the lamp chamber 212. The reflector 204 has a paraboloidal surface 220 directed toward the lens 210. A mounting hole 222 is formed centrally through the reflector 204 for mounting the discharge lamp bulb subassembly 16a via the bulb carrier subassembly 18a. A sleeve 224 extends rearwardly from the reflector 204 for receiving an adhesive 226 which retains the bulb carrier subassembly 18a in place on the reflector 204.

The bulb carrier subassembly 18a differs from the bulb carrier subassembly 18 of the FIGS. 1-5 headlamp system 10 in that the rear end portions 74 of the bulb support wires 64 project rearwardly to a greater extent. The longer rear end portions 74 of the bulb support wires 64 are intended for direct electrical connection to the lighting circuit assembly 208, as will be later explained in more detail.

Aiming Means

Reference may be had principally to FIGS. 8 and 9 for the following description of the aiming means 206. At 228 is shown a ball and socket joint pivotally joining the reflector 204 of the discharge lamp assembly 202 to the lamp body 100. The joint 228 comprises a ball 230 and a socket member 232. The ball 230 is formed on one end of a stud 234 which is screwed into a boss 236 on the lamp body 200. The socket member 232 is positively engaged with a hollow boss 238 formed on the back of the reflector 204. The ball 230 is rotatably received in a socket 240 in the socket member 232. Thus the discharge lamp assembly 202, as well as the lighting circuit assembly 208 mounted thereto, is universally pivotable within limits relative to the fixed lamp body 200.

Two aiming screws 242 are provided for pivoting the discharge lamp assembly 202 with respect to the lamp body 200. The positions of the two aiming screws 242 in relation to that of the ball joint 228 will become apparent from a study of FIG. 7.

Rotatably extending through a boss 244 on the back of the lamp body 200, each aiming screw 242 is threadedly engaged with a nut 246 affixed to the reflector 204. The aiming screws 242 have heads 248 exposed on the back of the lamp body 200. In order to aim the discharge lamp assembly 202, the heads 248 may be manipulated for driving the aiming screws 242 in either a tightening or a loosening direction. The discharge lamp assembly 202 will then move pivotally in any direction about the ball and socket joint 228.

Lighting Circuit Assembly

As illustrated in both FIGS. 6 and 8, the lighting circuit assembly 208 includes a circuit housing 250 enclosing the complete lighting circuit 114, FIG. 5, for the discharge lamp bulb subassembly 16a. The circuit housing 250 is rigidly mounted to a mounting plate 252 having a set of lugs 254. These lugs are fastened by screws 256 to bosses 258 projecting rearwardly from the reflector 204.

FIG. 6 clearly illustrates a pair of tubular sockets 260 projecting forwardly from the circuit housing 250 through openings, not shown, in the mounting plate 252. The sockets 260 loosely receive the output terminals 133, FIG. 5, of the lighting circuit 114 for electrical connection to the end portions 74 of the bulb support wires 64 of the bulb carrier subassembly 18a.

Therefore, simply as the lighting circuit assembly 208 is screw mounted as above to the back of the reflector 204, the rear end portions 74 of the bulb support wires 64 will be inserted in the sockets 260. So received in the sockets 260, the bulb support wires 64 will be in proper electrical engagement with the output terminals 133 of the lighting circuit 114. Accordingly, in this alternate lamp system 10a, no cables or equivalent conductors are required for electrically connecting the lighting circuit assembly 208 to the discharge lamp assembly 202. Nor are cables or the like needed between the ballast 116 and igniter 118 of the lighting circuit 114 as both ballast and igniter are housed in the sole circuit housing 250 mounted to the reflector 204.

CONCLUSION

The two aimable headlamp systems 10 and 10a are meant purely to illustrate or explain and not to impose limitations upon the present invention. A variety of modifications or alterations of the illustrate embodiments will manifest themselves to one skilled in the art in order to conform to design preferences or to the requirements of each specific application of the invention.

It will also be apparent that some features of the headlamp systems 10 and 10a are interchangeable. For example, in the headlamp system 10, the discharge lamp assembly 12 and the igniter circuit subassembly 24 could be directly coupled to each other, instead of by the cables 148. The separation of the lighting circuit assembly 14 into igniter subassembly 24 and ballast subassembly 26 in the headlamp system 10 is not essential, either. The igniter and ballast of the lighting circuit could be enveloped in a single housing mounted to the discharge lamp assembly, as in the alternate headlamp system 10a.

Also, in the alternate headlamp system 10a, the lighting circuit assembly 208 could be electrically connected to the discharge lamp assembly 202 via cables of minimal lengths, as in the headlamp system 10. Further the lighting circuit assembly 208 could be divided into a ballast subassembly and an igniter subassembly, with only the igniter subassembly mounted to the discharge lamp assembly 202.

All these and other modifications, alterations and adaptations of this invention are intended in the foregoing disclosure. It is therefore appropriate that the invention be construed broadly and in a manner consistent with the fair meaning or proper scope of the subjoined claims.

What is claimed is:

1. An aimable headlamp system to be mounted to a vehicle body, comprising:
   (a) a discharge lamp assembly comprising:
      (1) a discharge lamp bulb subassembly including a discharge lamp bulb; and
      (2) a bulb carrier subassembly directly coupled, both mechanically and electrically, to the discharge lamp bulb subassembly;
   (b) aiming means for mounting the discharge lamp assembly to the vehicle body in order to aim and retain the discharge lamp assembly in position with respect to the vehicle body; and
   (c) a lighting circuit assembly comprising:
      (1) an electric lighting circuit comprising ballast means for providing an alternating voltage, and igniter means electrically connected between the ballast means and the bulb carrier subassembly of the discharge lamp assembly for causing the discharge lamp bulb to glow by an electric discharge; and
      (2) a circuit housing enclosing at least the igniter means of the electric lighting circuit and mounted to the discharge lamp assembly for joint movement therewith relative to the vehicle body;
   (d) whereby the lighting circuit assembly can be electrically connected to the discharge lamp assembly without use of such elongate cables or cords as have been conventionally used therebetween.

2. The aimable headlamp system of claim 1 further comprising:
   (a) a pair of bulb support wires included in the bulb carrier subassembly of the discharge lamp assembly and electrically connected to the discharge lamp bulb, the bulb support wires projecting from the discharge lamp assembly toward the lighting circuit assembly; and
   (b) socket means formed on the circuit housing of the lighting circuit assembly and directly engaged with the bulb support wires for electrically connecting the lighting circuit assembly to the discharge lamp assembly.

3. The aimable headlamp system of claim 1 wherein the lighting circuit assembly further comprises a second circuit housing enclosing the ballast means of the electric lighting circuit and mounted to the vehicle body, the ballast means being electrically connected to the igniter means via flexible conductor means.

4. An aimable headlamp system to be mounted to a vehicle body, comprising:
   (a) a discharge lamp assembly comprising:
      (1) a lamp body having an open end;
      (2) a lens closing the open end of the lamp body and defining a lamp chamber in combination with the lamp body;
      (3) a discharge lamp bulb subassembly including a discharge lamp bulb and disposed in the lamp chamber; and (4) a bulb carrier subassembly coupled, both mechanically and electrically, to the discharge lamp bulb subassembly, the lamp carrier subassembly being mounted to the lamp body for mechanically supporting the discharge lamp bulb subassembly in position in the lamp chamber;

(b) aiming means for mounting the discharge lamp assembly to the vehicle body in order to aim and retain the discharge lamp assembly in position with respect to the vehicle body; and (c) a lighting circuit assembly comprising:
(1) an electric lighting circuit comprising ballast means for providing an alternating voltage, and igniter means electrically connected between the ballast means and the bulb carrier subassembly of the discharge lamp assembly for causing the discharge lamp bulb to glow by an electric discharge; and
(2) a circuit housing enclosing at least the igniter means of the electric lighting circuit and mounted to the lamp body of the discharge lamp assembly for joint movement therewith relative to the vehicle body;

(d) whereby the lighting circuit assembly can be electrically connected to the discharge lamp assembly without use of such elongate cables or cords as have been conventionally used therebetween.

5. The aimable headlamp system of claim 4 further comprising:
(a) a pair of bulb support wires included in the bulb carrier subassembly of the discharge lamp assembly and electrically connected to the discharge lamp bulb, the bulb support wires projecting from the lamp body toward the lighting circuit assembly; and
(b) socket means formed on the circuit housing of the lighting circuit assembly and directly engaged with the bulb support wires for electrically connecting the lighting circuit assembly to the discharge lamp assembly.

6. The aimable headlamp system of claim 4 wherein the lighting circuit assembly further comprises a second circuit housing enclosing the ballast means of the electric lighting circuit and mounted to the vehicle body, the ballast means being electrically connected to the igniter means via flexible conductor means.

7. An aimable headlamp system comprising:
(a) a lamp body;
(b) a lens mounted to the lamp body and defining a lamp chamber in combination therewith;
(c) a discharge lamp assembly comprising:
(1) a reflector disposed in the lamp chamber and oriented toward the lens;
(2) a discharge lamp bulb subassembly including a discharge lamp bulb and disposed between the reflector and the lens;
(3) a bulb carrier subassembly coupled, both mechanically and electrically, to the discharge lamp bulb subassembly, the lamp carrier subassembly being mounted to the reflector for mechanically supporting the discharge lamp bulb subassembly in position in the lamp chamber;

(d) aiming means for mounting the discharge lamp assembly to the lamp body in order to aim and retain the discharge lamp assembly in position with respect to the lamp body; and (e) a lighting circuit assembly comprising:
(1) an electric lighting circuit comprising ballast means for providing an alternating voltage, and igniter means electrically connected between the ballast means and the bulb carrier subassembly of the discharge lamp assembly for causing the discharge lamp bulb to glow by an electric discharge; and
(2) a circuit housing enclosing at least the igniter means of the electric lighting circuit and mounted to the reflector of the discharge lamp assembly for joint movement therewith relative to the lamp body;

(f) whereby the lighting circuit assembly can be electrically connected to the discharge lamp assembly without use of such elongate cables or cords as have been conventionally used therebetween.

8. The aimable headlamp system of claim 7 further comprising:
(a) a pair of bulb support wires included in the bulb carrier subassembly of the discharge lamp assembly and electrically connected to the discharge lamp bulb, the bulb support wires projecting from the reflector toward the lighting circuit assembly; and
(b) socket means formed on the circuit housing of the lighting circuit assembly and directly engaged with the bulb support wires for electrically connecting the lighting circuit assembly to the discharge lamp assembly.

* * * * *